Patented July 3, 1923.

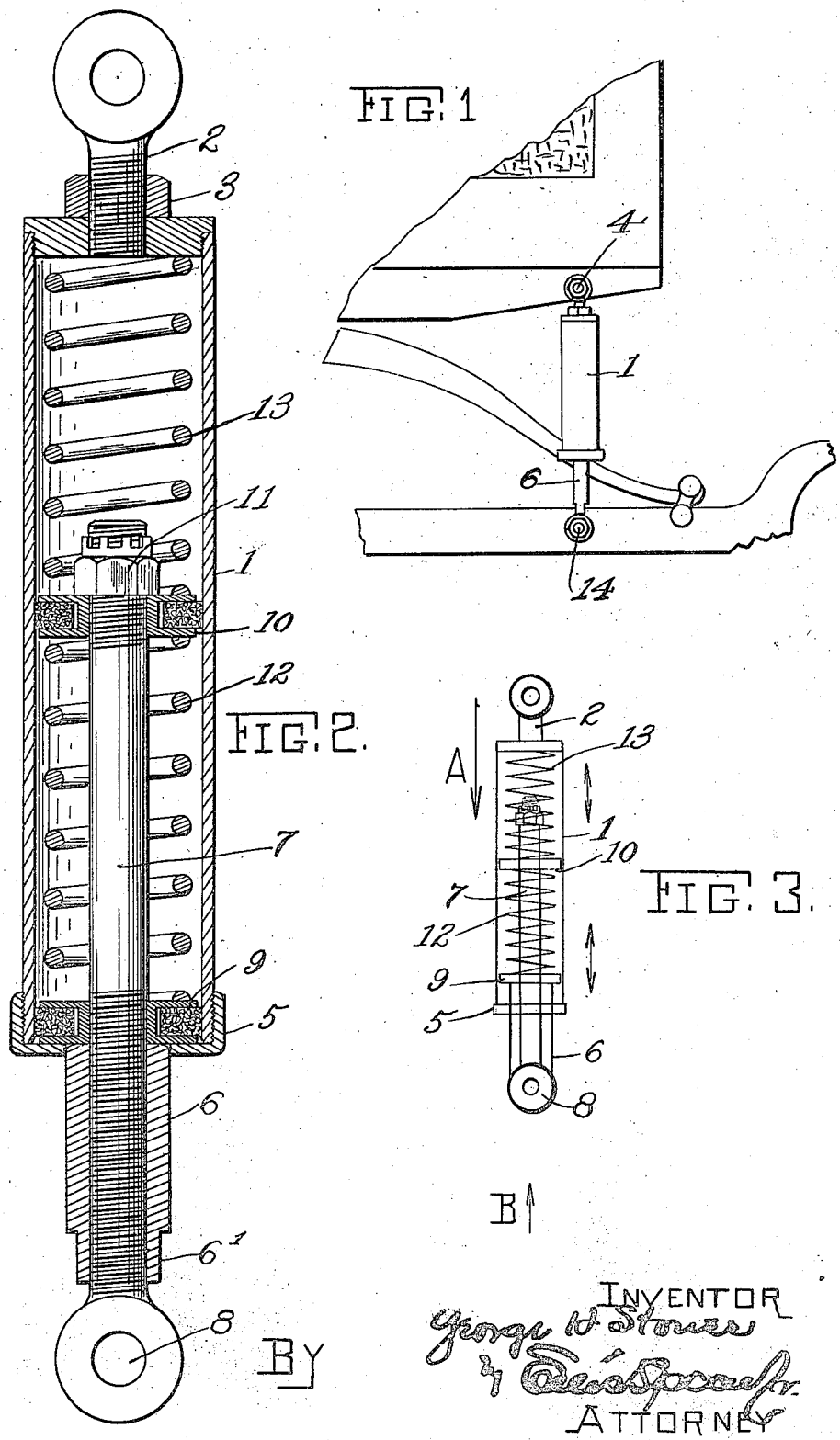

1,460,771

UNITED STATES PATENT OFFICE.

GEORGE H. STONER, OF EAST BOSTON, MASSACHUSETTS.

SHOCK ABSORBER.

Application filed August 13, 1917. Serial No. 185,807.

*To all whom it may concern:*

Be it known that I, GEORGE H. STONER, a citizen of the United States, residing at East Boston, county of Suffolk, Commonwealth of Massachusetts, have invented certain new and useful Improvements in Shock Absorbers, of which the following is a specification.

This invention relates to shock absorbers and particularly to absorbers of the double compression type. Shock absorbers of this type, while more efficient in taking care of rebound, have usually some phase or phases of their movement in which they do not quickly catch rebound or shock from the direction opposite to that in which they have just been stressed.

It is more the exception than the rule in ordinary running that the relative movement between the car body and the axle is extremely complicated both as regards degree of shock and the motion arising therefrom, so that the result is a continuous variant, both as to direction and intensity and must be accommodated not only in various positions of lateral displacement between the body and the wheels, but at different distances between the body and the wheels. This matter of distance is an extremely important one, and has to be considered in two classes, first the distance due to the varying load on the body, and second the varying separation due to the compression or throw of the springs.

Furthermore, the use of springs in shock absorbers has given rise to much structural difficulty on account of the natural limitation of springs, especially as to length. The spring of ample length to give a full margin of efficiency and safety is almost certain to be awkwardly long, while a spring of convenient shortness is apt to be overstressed and either set or broken.

In my invention I have made possible the use of springs of convenient length, but have so disposed them by division and confinement as to make both springs effective and practically equally and instantaneously effective in any phase or movement. I am aware that springs have been divided, but usually such division has either divided the spring efficiency or has left inoperative phases or both. In my invention I have overcome this by confining a divided spring in such a way between the opposite relatively movable parts of the absorber that shock or rebound from either end thereof and in either direction will be promptly met by the combined lengths of the springs.

As illustrated in my invention, I have shown a simple form of shock absorber of compression spring type which is highly efficient and yet simple and inexpensive to manufacture. In the drawings illustrative of an embodiment thereof:

Fig. 1 is a general view of my shock absorber in position on the car.

Fig. 2 is a central longitudinal section, and

Fig. 3 a somewhat diagrammatic view illustrative of its operation.

In the form shown in the drawings I form a cylindrical casing 1 on the end of which I seat an adjustable bolt 2 held by a lock nut 3 adapted to be pivotally connected to the stud 4 on the body of the car preferably over the axle. The opposite end of the casing 1 is capped by a threaded cover 5 having a central opening through which an adjustable block 6 passes being squared at 6¹ for a wrench hold. The block is threaded on a stem 7 having an eye 8 adapted to be engaged by a stud 14 on the axle of the car. On the stem 7 are two pistons 9 and 10. The piston 10 is confined by a stop nut 11 and the piston 9 is held separated therefrom by a spring 12. On the opposite side of the piston 11 is a spring 13 seated against the closed end of the cylinder and bearing on the opposed face of the piston.

With reference to Fig. 1, it will be seen that the absorber is pivotally mounted on both body and axle and capable of following up any play or little motion between the two as well as take any direct thrust or rebound.

It will be noted in the operation and referring to the arrow A that any movement emanating from the body of the car is received by the casing 1 which is cushioned on the spring 13 which in turn bears on the piston 10 and is thus transmitted to the spring 12. In this direction therefore my shock absorber gets the full benefit of the entire resiliency of both springs. On any movement emanating from a body rebound such as might occur from the movement just mentioned, it will be noted that the pull comes on the casing 1 which at that movement is at some phase of depression along the block 6 so that its cap member 5 is somewhat separated from the piston 9. This space represents a slight lost motion which has to be taken up in order that the cap 5 may engage the piston 9 and thus encounter the opposing spring. This take up does not in my shock absorber, however, have the usual augmenting effect common to usual spring construction because the piston 10 which has been pulled down on the stem 7 under the compression of the spring 13 is returning to its position against the nut 11 which constitutes its upward stop. By the time the casing has made its slight movement upward to cause its cap to find the piston 9, the piston 10 which acts as the backing of the spring 12 in this motion has found its seat against its stop gently as it has followed up the relief pressure on the spring 13 and the spring 12 will therefor immediately begin to cushion the upward pull on the casing.

In the same manner upon a thrust from the axle as in the direction of the arrow B, the shoulder nut 6 through the piston 9 compresses the spring 12 thus forcing along the piston 10 and compressing spring 13. On the return the stem 7 receives the downward pull, but while its nut 11 is finding the piston 10, the spring 13 through the piston 10 and the spring 12 is compelling the piston 9 to follow up the retreating block 6 so that it is in position to absorb the downward pull of the stem 7 on its stop nut 11 which finds the piston 10.

These movements while described as successive movements are in practice so merged owing to the quickness of the springs in their operation against each other through the central piston that their effect is practically instantaneous and balanced to an unusual degree. The springs 12 and 13 are assembled under a slight compression so that there is always a margin of resilience in whichever direction movement may come and whatever position the parts may be in at the time any new movement begins.

It will be noted that on the rebound in either direction that spring which is to constitute the backing in the case of the rebound has to expand and thus relieve itself before it can begin to take the thrust which is coming upon it. This causes the spring to advance to meet the coming shock and catch it slightly ahead of its normal point of compression. In this manner I am able to employ springs of minimum size and length and with a minimum risk of breaking and with a maximum spring efficiency the full length of the spring on all direct thrusts and with the full effect of one spring at its point of greatest advantage of any rebound. The pistons 9 and 10 are preferably packed to provide a close fit and thus afford a slight air cushioning effect.

Various modifications may obviously be made in the construction and arrangement of parts, and the number and disposition of the springs, in the style and manner of assembling and mounting, all without departing from the spirit of my invention if within the limits of the appended claims.

I claim—

1. In a shock absorber, a pair of oppositely faced relatively movable members, a headed stem on one member and disposed towards the other member, a bearing piece slidably mounted on said stem and confined by said head, a spring interposed between said stem carrying member and said bearing piece, and a second spring disposed between said piece and the other member.

2. In a shock absorber, a cylindrical casing closed at one end, a piston in said casing and retained against withdrawal therefrom, an axial headed stem on said piston, a bearing piece slidable on said stem behind the head thereof, a spring between said bearing piece and piston, and a second spring between the closed end of said casing and said bearing piece.

3. In a shock absorber, a slidable casing, a headed stem therein, a bearing member slidable on said stem and limited in its movement in one direction by direct contact with the head of said stem, a pair of springs acting on opposite faces of said bearing member, and a second bearing member slidable on said stem and acting on one of said springs.

4. In a shock absorber, a casing, a stem in said casing having an inwardly faced shoulder, a piston loose on said stem and normally seated on said shoulder, an inwardly faced bearing on said casing and disposed towards said piston, a second piston on said stem, a stop on said stem beyond said second piston, a spring between the said pistons, and a second spring between the last-named piston and the bearing of said casing.

5. In a shock absorber, a slidable casing, a stem in said casing having a nut threaded thereon, a piston loose on said stem and normally seated against said nut, an inwardly faced bearing on said casing and disposed towards said piston, a second piston movably mounted on said stem, a spring between the said pistons, and a second spring between the last-named piston and the bearing of said casing.

6. In a shock absorber, a casing, a stem therein, a bearing member slidable on said stem, a pair of springs acting on opposite faces of said bearing member, a stop on said stem against which said bearing member directly contacts in one direction of its movement, and a second bearing member slidable on said stem and acting on one of said springs.

7. In a shock absorber, a casing, a stem in said casing, a pair of spring members confined in said casing, a piston disposed between the inner ends of said spring members and loose on said stems, a stop on said stem and bearing on said piston in one direction and a second piston movable on said stem opposite to said first named piston.

In testimony whereof I affix my signature in presence of two witnesses.

GEORGE H. STONER.

Witnesses:
EDWARD L. GILSON,
ROBERT J. MEHANG.